Feb. 10, 1925.
A. J. CHAPIN
AUTOMATIC SLACK ADJUSTER
Filed Dec. 7, 1922
1,525,568
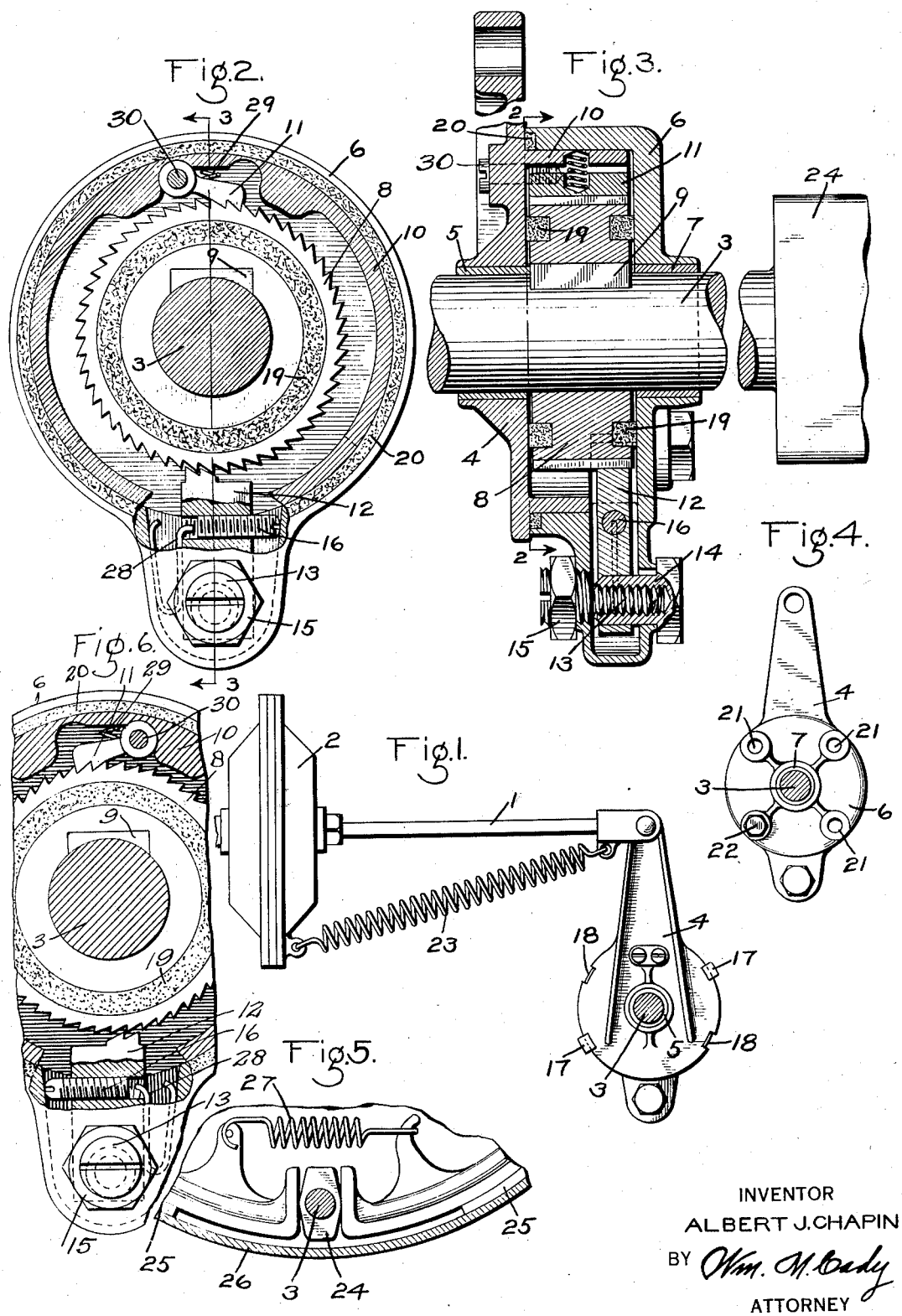
INVENTOR
ALBERT J. CHAPIN
BY Wm. M. Brady
ATTORNEY Patented Feb. 10, 1925.

1,525,568

UNITED STATES PATENT OFFICE.

ALBERT J. CHAPIN, OF GLENDALE, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMATIC SLACK ADJUSTER.

Application filed December 7, 1922. Serial No. 605,505.

*To all whom it may concern:*

Be it known that I, ALBERT J. CHAPIN, a citizen of the United States, residing at Glendale, in the county of Los Angeles and State of California, have invented new and useful Improvements in Automatic Slack Adjusters, of which the following is a specification.

This invention relates to automatic slack adjusters, and more particularly to a slack adjuster adapted for use in connection with automotive brakes.

One object of my invention is to provide a slack adjuster particularly adapted for automotive brakes.

Another object is to provide a relatively small, compact, and self-contained mechanism which may be readily interposed in the brake rigging for taking up the slack, due to the wear of the brake bands or brake shoes.

In the accompanying drawing, Fig. 1 is a view showing a slack adjuster embodying my invention associated with a diaphragm brake chamber; Fig. 2 a section of the slack adjuster on the line 2—2 of Fig. 3; Fig. 3 a section on the line 3—3 of Fig. 2; Fig. 4 a reverse face view of the slack adjuster; Fig. 5 a fragmentary view, showing the cam for expanding the brake shoes within the brake drum; and Fig. 6 a view similar to Fig. 2 showing the parts in the reversed position.

A well known type of brake employed on motor vehicles comprises a drum having an internal braking surface, brake shoes or a brake band adapted to engage the braking surface of the drum, and a cam adapted upon rotation to expand the brake shoes or the brake band so as to frictionally engage the braking surface of the drum.

As the brake shoes or brake band wear a further rotative movement of the cam is required in order to secure braking action. The present slack adjuster is particularly designed to compensate for this movement of the cam due to wear, so that the angular movement of the brake lever will be maintained constant.

As shown in the drawing, the slack adjuster is interposed between the diaphragm rod 1 of a diaphragm brake chamber 2 and the cam shaft 3 of the brake mechanism. The slack adjuster may comprise a brake lever member 4 having a pivotal connection to the diaphragm rod 1 and rotatably mounted on the cam shaft 3, preferably with an interposed renewable bushing 5. Also mounted on the shaft 3 is a casing 6 adapted to be secured to a stationary part of the vehicle, preferably the rear axle housing, a renewable bushing 7 being interposed between the shaft 3 and the casing.

Within the casing 6, a ratchet wheel 8 is secured by a key 9 to the shaft 3. The member 4 is provided with a cylindrical portion 10 which extends into the casing 6 and a driving pawl 11 is pivotally mounted on the portion 10, so as to engage the teeth of the ratchet wheel 8. In a recessed extension of the casing 6, an adjusting pawl 12 is mounted, so as to engage the teeth of the ratchet wheel 8.

In order to provide for adjustment of the pawl 12, the pawl is mounted on an eccentric stud 13, a bushing 14 having screw-threaded engagement with the eccentric portion of the stud being interposed between the pawl and the stud. By turning the stud, the pawl 12 may be moved toward or away from the teeth of the ratchet wheel as desired and when the proper adjustment is secured the stud may be clamped in position by a nut 15. The bushing 14 is provided, so that by removing the bushing, the pawl will be free to drop down out of engagement with the ratchet wheel and thus permit adjustment of the ratchet wheel on the road, if necessary, without disturbing the adjustment of the stud 13. Lateral adjustment of the pawl 12 is provided by a stop screw 16, adapted to engage the inner wall of the pawl recess in the casing 6, so as to limit the movement of the pawl in one direction.

The member 4 is held in assembly with the casing 6 by means of lugs 17 carried by the casing 6 and the parts are assembled by applying the member 4 so that openings 18 in the annular portion of the member 4 are in alinement with the lugs 17. The parts are then pressed into position and the member 4 is rotated to the position shown in the drawing. When the slack adjuster is in operation, the relative movement of the parts is never sufficient to bring the openings 18 into alinement with the lugs 17.

Felt washers 19 are placed in annular grooves provided at opposite sides of the ratchet wheel 8 in order to make the inside of the slack adjuster weather and dirt proof. A felt washer 20 is also placed in an annular recess in the casing 6 where the casing engages the member 4, for the same purpose as the washers 19.

The casing 6 is preferably provided with four screw-threaded openings 21, three of which are used at a time, according to whether the slack adjuster is applied at the left or the right hand and the lower screw-threaded opening not in use may be filled with a bolt 22.

A spring 23, connected at one end to the brake chamber 2 and at the other end to the diaphragm rod 1, tends to move the rod 1 and the brake lever 4 to normal release position. The cam shaft 3 carries a cam 24 which is adapted upon rotation to expand brake shoes or a brake band 25, so as to frictionally engage the interior face of a brake drum 26, as shown in Fig. 5, and a spring 27 tends to release the brake band 25 from engagement with the drum when the cam 24 is rotated in the direction to release the brake.

A spring 28 tends to move the pawl 12 so that the screw 16 engages the wall of the casing 6 and a spring 29 acts on the pawl 11 so as to yieldingly maintain engagement between the pawl and the ratchet wheel 8. The pawl 11 is held in place by a cap screw 30 and provision is made so that the position of the pawl may be reversed, by removing the cap screw and placing the pawl in the reverse position in the recess provided for that purpose. The pawl 12 may also be reversed when the ratchet wheel 8 is reversed, so that one construction provides for the use of the slack adjuster mounted in either a right or left hand position, the position of the parts when reversed being clearly shown in Fig. 6.

In operation, with the casing 6 held against rotation, being secured in a fixed position to the vehicle construction, when the brakes are applied by supplying fluid under pressure to the diaphragm chamber 2, the rod 1 is moved to the right and the lever 4 is thereby operated to partially rotate the ratchet wheel 8 through the driving pawl 11. The cam shaft 3 is correspondingly rotated and thus the cam 24 is operated to expand the brake shoes or brake band 25, so that braking action is secured by frictional engagement of the brake shoes 25 with the drum 26. During this movement, the pawl 12 is rotated to the left by the movement of the ratchet wheel 8. In releasing the brakes, fluid pressure being exhausted from the diaphragm chamber 2, the spring 23 operates to shift the diaphragm rod 1 and its connected parts, including the pawl 11, to the left and the ratchet wheel 8 follows up the movement of the pawl 11, through the action of the spring 27 on the cam 24, which tends to rotate the shaft 3 toward the left.

The parts of the slack adjuster operate in this way so long as the wear of the brake shoes or the drum do not exceed a predetermined amount, but if the wear is such that the movement of the ratchet wheel 8 in applying the brakes is sufficient to permit a tooth of the ratchet wheel to slip past the pawl 12, then when the brakes are released, the pawl 12 will prevent the return of the ratchet wheel 8 to its former release position to the extent of one tooth of the ratchet wheel. The lever 4 and the pawl 11, however, will continue the release movement to the left as before and in this movement, the pawl 11 will slip past a tooth of the ratchet wheel 8.

The cam shaft 3 and the cam 24 will thus be adjusted to an advanced angular position corresponding with the movement of the ratchet wheel 8 to the extent of one tooth. The wear of the brake shoes is thus compensated for, so that the cam 24 will effect the same expansive movement of the brake shoes with the same angular movement of the brake lever 4 as existed before wear took place.

Having now described my invention, what I claim as new and desire to secure by Letters Patent, is:—

1. In a slack adjuster, the combination with a rotatable shaft, means operable by said shaft for applying the brakes, and a brake lever for rotating said shaft of a ratchet wheel secured to said shaft, a pivoted pawl engaging said ratchet wheel and movable with said brake lever, and a pivoted pawl engaging said ratchet wheel and fixed against rotation with said shaft.

2. In a slack adjuster, the combination with a rotatable shaft, means operable by said shaft for applying the brakes, and a brake lever for rotating said shaft, of a ratchet wheel secured to said shaft, a pawl operated by said brake lever for effecting a rotative movement of the ratchet wheel, and a pawl for engaging and holding the ratchet wheel in an advanced position upon movement of the brake lever and ratchet wheel in excess of a predetermined amount.

3. In a slack adjuster, the combination with a rotatable shaft, of a ratchet wheel rotatable with said shaft, a pawl for engaging the teeth of the ratchet wheel, a member for operating said pawl to rotate the ratchet wheel, and a pawl for engaging a tooth in the ratchet wheel to hold the wheel in an advanced position when the rotative movement of said member and the ratchet wheel exceeds a predetermined amount.

4. In a slack adjuster, the combination with a rotatable shaft and a brake lever for operating said shaft, of a ratchet wheel secured to said shaft, a pawl operated by said brake lever for rotating said shaft, a pawl for holding said ratchet wheel against rotation in one direction, and an eccentric pin in which said holding pawl is mounted to permit adjustment of the pawl toward or away from the ratchet wheel.

5. In a slack adjuster, the combination with a rotatable shaft and a brake lever for operating said shaft, of means interposed between said brake lever and said shaft for taking up slack including a ratchet wheel and a holding pawl, a bearing pin, and a removable bushing interposed between said pin and said holding pawl.

6. In a slack adjuster, the combination with a rotatable shaft and a brake lever for operating said shaft, of means interposed between said brake lever and said shaft for taking up slack including a ratchet wheel and a holding pawl, an eccentric bearing pin, and a removable bushing mounted on said pin and providing a pivot bearing for said pawl.

In testimony whereof I have hereunto set my hand.

ALBERT J. CHAPIN.